United States Patent
Isobe

(10) Patent No.: US 10,253,199 B2
(45) Date of Patent: Apr. 9, 2019

(54) INKJET INK

(71) Applicant: General Co., Ltd., Osaka (JP)

(72) Inventor: Kozo Isobe, Osaka (JP)

(73) Assignee: GENERAL CO., LTD., Osaka (JP)

( * ) Notice: Subject to any disclaimer, the term of this patent is extended or adjusted under 35 U.S.C. 154(b) by 162 days.

(21) Appl. No.: 15/303,599

(22) PCT Filed: Apr. 16, 2015

(86) PCT No.: PCT/JP2015/061678
§ 371 (c)(1),
(2) Date: Oct. 12, 2016

(87) PCT Pub. No.: WO2015/166809
PCT Pub. Date: Nov. 5, 2015

(65) Prior Publication Data
US 2017/0037269 A1     Feb. 9, 2017

(30) Foreign Application Priority Data

Apr. 28, 2014  (JP) .................................. 2014-092733
Oct. 31, 2014  (JP) .................................. 2014-223166

(51) Int. Cl.
| | | |
|---|---|---|
| *C09D 11/38* | (2014.01) | |
| *C09D 11/36* | (2014.01) | |
| *B41J 2/01* | (2006.01) | |
| *C09D 11/03* | (2014.01) | |
| *C09D 11/102* | (2014.01) | |
| *C09D 11/328* | (2014.01) | |

(52) U.S. Cl.
CPC ................ *C09D 11/36* (2013.01); *B41J 2/01* (2013.01); *C09D 11/03* (2013.01); *C09D 11/102* (2013.01); *C09D 11/328* (2013.01); *C09D 11/38* (2013.01)

(58) Field of Classification Search
CPC ................................ C09D 11/30; C09D 11/38
See application file for complete search history.

(56) References Cited

U.S. PATENT DOCUMENTS

| | | | | |
|---|---|---|---|---|
| 8,765,838 B2 * | 7/2014 | Hosoya | ............... | C09D 11/322 523/160 |
| 2007/0244219 A1 * | 10/2007 | Vaidya | ................... | C09D 11/03 523/160 |
| 2008/0043080 A1 * | 2/2008 | Isobe | .................... | C09D 11/30 347/101 |
| 2009/0053415 A1 * | 2/2009 | Isobe | .................... | C09D 11/03 427/256 |
| 2012/0071593 A1 * | 3/2012 | Andre | .................... | C08G 69/26 524/90 |
| 2012/0083567 A1 * | 4/2012 | Hosoya | ............... | C09D 11/322 524/516 |
| 2012/0252948 A1 * | 10/2012 | King | .................... | C09D 11/322 524/314 |
| 2014/0364548 A1 * | 12/2014 | Everhardus | .......... | C09D 11/322 524/166 |
| 2017/0066937 A1 * | 3/2017 | Van Rens | ............. | C09D 11/10 |
| 2018/0072902 A1 * | 3/2018 | Takemoto | ............ | C09D 11/103 |
| 2018/0251650 A1 * | 9/2018 | Xue | ..................... | C09D 11/102 |

FOREIGN PATENT DOCUMENTS

| | | |
|---|---|---|
| JP | S59-202230 A | 11/1984 |
| JP | H10-140060 A | 5/1998 |
| JP | 2000-038530 A | 2/2000 |
| JP | 2000-178487 A | 6/2000 |
| JP | 2006-299117 A | 11/2006 |
| JP | 2007-321128 A | 12/2007 |
| JP | 2008-150530 A | 7/2008 |

OTHER PUBLICATIONS

JP 2000-178487 to Yamada. English Translation. Obtained from AIPN/JPO website on Jun. 21, 2018.*

* cited by examiner

*Primary Examiner* — Michael A Salvitti
(74) *Attorney, Agent, or Firm* — Rabin & Berdo, P.C.

(57) ABSTRACT

An inkjet ink includes a polyamide resin; at least one tackifier that is selected from the group consisting of a terpene phenol resin and a rosin ester, and that has a hydroxyl value that ranges from 10 to 45 mgKOH/g; a solvent dye; and an alcohol having 1 to 3 carbon atoms. The inkjet ink has quick-drying properties, is capable of satisfactorily improving printing fixability with respect to a non-absorptive printing object made of polyolefin or the like, is excellent in storage stability so that precipitation etc., do not easily occur for a long time, and is excellent in intermittent printability so that the nozzle of an inkjet printer is not easily clogged during a decapping time.

16 Claims, No Drawings

INKJET INK

TECHNICAL FIELD

The present invention relates to an inkjet ink that is printable on surfaces of non-absorptive printing object, such as a plastic film, a coated paper, and a laminated paper, according to an inkjet printing method and that does not need to perform a heating/drying step after printing.

BACKGROUND ART

When printing is performed on a surface of a non-absorptive printing object, such as a plastic film, a coated paper, or a laminated paper, according to an inkjet printing method, an inkjet ink that has undergone printing is generally heated and dried.

However, recently, inkjet inks, such as HEATLESSINK (registered trademark), have been developed and have been coming into practical use, which are capable of excluding a heating/drying step by being provided with quick-drying properties that result from the fact that only an organic solvent is used as a solvent or from the fact that a so-called organic solvent rich state in which an organic solvent is larger in quantity than water is reached even when water is used together as a solvent.

Additionally, recently, various studies have been made to perform printing that is more excellent in fixability than before by using such a quick-drying inkjet ink for a polyolefin-based printing object, such as a polypropylene film or a polypropylene laminated paper or the like, which has difficulty in excellent in fixability printing particularly because of small polarity, among the non-absorptive printing object.

For example, PTL 1 proposes that a polyamide resin that serves as a binder and at least one kind selected from the group consisting of a terpene phenol resin, a dicyclopentadiene resin, and a rosin ester each of which serves as a tackifier that gives tackiness to the polyamide resin so as to improve printing fixability with respect to a printing object should be compounded together in a quick-drying inkjet ink.

PTL 2 proposes that two kinds of polyamide resins having mutually-different acid values and a rosin-modified maleic acid resin and/or a terpene phenol resin serving as a tackifier should be compounded together.

PTL 3 proposes that a polyamide resin, a rosin-modified maleic acid resin that serves as a tackifier, and a titanium chelate should be compounded together.

However, disadvantageously, in any of the conventional quick-drying inkjet inks of Patent Documents 1 to 3 or the like, precipitation is liable to occur because stability is insufficient during ink storage, or blurring etc. is liable to occur when printing is restarted because a nozzle of an inkjet printer is clogged at the decapping time of printing in addition to the fact that printing fixability with respect to a polyolefin-based printing object or the like still cannot be improved satisfactorily.

The term "decapping time" denotes a period of time during which an inkjet ink in a nozzle among a plurality of nozzles provided in an inkjet printer is exposed to the open air in a standby state in which ink droplets are not discharged in accordance with a printing pattern in intermittent printing.

An inkjet printer is generally provided with a function to close a nozzle (to cap a nozzle) so as not to cause clogging that results from the fact that an inkjet ink in the nozzle is exposed to the open air and is dried ordinarily when the operation of the inkjet printer is being stopped.

However, such capping is released when printing is performed, and therefore a nozzle, which is in a standby state particularly when intermittent printing is performed, remains in a state (decapping state) in which the nozzle is not closed until ink droplets are discharged next time, and the inkjet ink in the nozzle is continuously exposed to the open air during that time. Therefore, there is a tendency for the nozzle to be clogged more easily in proportion to an increase in this period of time, i.e., in proportion to an increase in the duration of the decapping time.

Hereinafter, a feature characterized in that the nozzle is not easily clogged for the decapping time is evaluated in terms of whether "intermittent printability" is excellent or not. An inkjet ink can be evaluated as becoming more excellent in intermittent printability in proportion to an increase in the duration of a decapping time during which clogging is not caused.

CITATION LIST

Patent Literature

PTL 1: Japanese Published Unexamined Patent Application No. 10-140060

PTL 2: Japanese Published Unexamined Patent Application No. 2000-038530

PTL 3: Japanese Published Unexamined Patent Application No. 2000-178487

SUMMARY OF INVENTION

Technical Problem

An object of the present invention is to provide an inkjet ink that has quick-drying properties, that is capable of satisfactorily improving printing fixability with respect to a non-absorptive printing object made of, particularly, polyolefin or the like, that is excellent in storage stability so that precipitation etc., do not easily occur for a long time, and that is excellent in intermittent printability so that a nozzle is not easily clogged for a decapping time.

Solution to Problem

The present invention relates to an inkjet ink comprising:

(1) a polyamide resin, (2) at least one kind of tackifier selected from the group consisting of a terpene phenol resin and a rosin ester whose hydroxyl value is 10 mgKOH/g or more and is 45 mgKOH/g or less, (3) a solvent dye, and (4) an alcohol having 1 to 3 carbon atoms.

Advantageous Effects of Invention

According to the present invention, it is possible to provide an inkjet ink that has quick-drying properties, that is capable of satisfactorily improving printing fixability with respect to a non-absorptive printing object made of, particularly, polyolefin or the like, that is excellent in storage stability so that precipitation etc., do not easily occur for a long time, and that is excellent in intermittent printability so that a nozzle is not easily clogged for a decapping time.

DESCRIPTION OF EMBODIMENTS

An inkjet ink of the present invention includes
(1) a polyamide resin,
(2) at least one kind of tackifier selected from the group consisting of a terpene phenol resin and a rosin ester in which a hydroxyl value is 10 mgKOH/g or more and is 45 mgKOH/g or less,
(3) a solvent dye, and
(4) an alcohol having 1 to 3 carbon atoms.

According to an examination of the inventor, the terpene phenol resin and/or the rosin ester in which a hydroxyl value is 10 mgKOH/g or more and is 45 mgKOH/g or less of item (2) are selected as a tackifier that improves printing fixability with respect to a non-absorptive printing object, and are used together with the polyamide resin of item (1), the solvent dye of item (3), and the alcohol of item (4), and, as a result, it becomes possible to obtain an inkjet ink that is excellent in printing fixability and that is also excellent in storage stability and in intermittent printability.

In other words, the tackifier whose hydroxyl value is less than 10 mgKOH/g is low in polarity, and therefore this is excellent in the effect of improving printing fixability with respect to a printing object made of, particularly, polyolefin or the like, and yet solubility is insufficient with respect to the alcohol of item (4) because its polarity is too low, and it is impossible to excellently dissolve it in an inkjet ink. Therefore, the storage stability of the inkjet ink is defective so that precipitation is liable to occur, and the intermittent printability thereof is also defective so that the nozzle is liable to be clogged for a decapping time.

On the other hand, the tackifier whose hydroxyl value exceeds 45 mgKOH/g is high in polarity, and therefore it is possible to excellently dissolve the tackifier in the alcohol of item (4) and hence is possible to improve the storage stability of the inkjet ink, and yet this is insufficient in the effect of improving printing fixability with respect to a printing object made of, particularly, low-polarity polyolefin or the like.

Additionally, the tackifier whose hydroxyl value exceeds 45 mgKOH/g greatly changes its solubility in response to the volatilization of the alcohol of item (4), and therefore, for example, if the inkjet ink is continuously exposed to the open air in the nozzle, the viscosity of the inkjet ink is liable to greatly rise in response to the volatilization of the alcohol. Therefore, the inkjet ink is defective in intermittent printability so that the nozzle is liable to be clogged for a decapping time.

By the way, any of the tackifiers used in PTL 1 to 3 is a tackifier having a large hydroxyl value exceeding 45 mgKOH/g, and therefore, as described above, the inkjet ink is not sufficient in the effect of improving printing fixability with respect to a polyolefin-based printing object or the like, and is defective in intermittent printability so that the nozzle is liable to be clogged for a decapping time.

On the other hand, the tackifier of item (2) whose hydroxyl value is 10 mgKOH/g or more and is 45 mgKOH/g or less is selected and used, and, as a result, any of the aforementioned problems is solved, and it is possible to obtain an inkjet ink that is excellent in printing fixability and is also excellent in storage stability and in intermittent printability.

It should be noted that, in the present invention, the hydroxyl value of a terpene phenol resin and/or the hydroxyl value of a rosin ester are represented by values measured in accordance with a measurement method mentioned in Japanese Industrial Standards JIS K0070: 1992 "Test methods for acid value, saponification value, ester value, iodine value, hydroxyl value and unsaponifiable matter of chemical products."

<(1) Polyamide Resin>

For example, various polyamide resins each of which is synthetically produced by the condensation of an aminocarboxylic acid or by the condensation of a dibasic acid and an amine, each of which has linear structure and has an amid group in the molecule, and each of which is excellently dissolvable in the alcohol having 1 to 3 carbon atoms of item (4) can be used as the polyamide resin. The reason why the binder resin is limited to these polyamide resins is as follows.

In detail, many other resins do not dissolve in the alcohol of item (4), and therefore solvents, such as toluene, having even higher solubility must be selected as the solvent. However, there is a risk that toluene or the like will impair a head of an inkjet printer and, as a result, an inkjet ink will be contaminated by components that have been eluted thereby, and, in addition, toluene or the like imposes a large burden on the environment.

On the other hand, all of the aforementioned problems can be solved by using the polyamide resin of item (1) that excellently dissolves in the alcohol having 1 to 3 carbon atoms of item (4) as the binder resin.

One kind or two or more kinds selected from among, for example, Versamid (registered trademark) 725, 744, 756, 759 made by BASF Japan Ltd., Sunmide 615A, 640 made by Air Products Japan, Inc., and Tohmide (registered trademark) 90, 92, 391, 394-N, 395, TXC-135-G made by T&K TOKA CO., LTD. can be mentioned as polyamide resins that satisfy those conditions.

<(2) Tackifier>

As described above, at least one kind selected from the group consisting of a terpene phenol resin and a rosin ester whose hydroxyl value is 10 mgKOH/g or more and is 45 mgKOH/g or less is used as the tackifier.

The tackifier of item (2) whose hydroxyl value falls within the aforementioned range has appropriate solubility with respect to the alcohol of item (4), and therefore it is possible to excellently dissolve the tackifier in an inkjet ink, and is possible to improve the storage stability of the inkjet ink.

Additionally, it is possible to improve intermittent printability so that a nozzle is not easily clogged for a decapping time.

Still additionally, the polarity of the tackifier is not too high, and therefore it is also possible to secure sufficient fixability with respect to, particularly, a polyolefin-based printing object or the like.

Various terpene phenol resins each of which is a copolymer created between terpene that has a basic skeleton $(C_5H_8)_p$ (where p indicates an integer) in which isoprenes are successively linked together at the head and at the tail and phenols and whose hydroxyl value falls within the aforementioned range are usable as the terpene phenol resin.

One kind or two or more kinds selected from among, for example, YS POLYSTER U130 (hydroxyl value: 25 mgKOH/g), YS POLYSTER U115 (hydroxyl value: 30 mgKOH/g), a prototype resin (hydroxyl value: 10 mgKOH/g), and a prototype resin (hydroxyl value: 40 mgKOH/g) each of made by YASUHARA CHEMICAL CO., LTD. can be mentioned as the terpene phenol resin.

It is possible to use various rosin esters each of which is an ester consisting of a rosin and alcohols and whose hydroxyl value falls within the aforementioned range as the rosin ester, in which the rosin is made mainly of an abietic-type or pimaric-type resin acid that is a monobasic carboxylic acid and that has an alkylated hydrophenanthrene nucleus.

In this connection, for example, a rosin made of a resin acid including an unsaturated bond among abietic acid, dextropimaric acid, and the like, a hydrogenated rosin made mainly of dihydroabietic acid, tetrahydroabietic acid, etc., to which hydrogen has been added, and similar rosins can be mentioned as the rosin. Additionally, for example, glycerin, pentaerythritol, triethylene glycol, etc., can be mentioned as the alcohols.

One kind or two or more kinds selected from among, for example, KSU005 (hydroxyl value: 11.5 mgKOH/g), KSU007 (hydroxyl value: 26.8 mgKOH/g), and DS-822 (hydroxyl value: 29 mgKOH/g) each of which is made by Harima Chemicals, Inc., Super Ester A-125 (hydroxyl value: 25 mgKOH/g), PENSEL (registered trademark) D-125 (hydroxyl value: 30 mgKOH/g), and PINECRYSTAL (registered trademark) KE-359 (hydroxyl value: 43 mgKOH/g) each of which is made by ARAKAWA CHEMICAL INDUSTRIES, LTD., Pentalyn (registered trademark) CJ (hydroxyl value: 40 mgKOH/g) made by Rika Fine-Tech Inc., and the like can be mentioned as the rosin ester.

<Compounding Ratio, Compounding Proportion>

Preferably, in consideration of the improvement of printing fixability, the compounding ratio (mass ratio) between a polyamide resin and a tackifier is:

(polyamide resin)/(tackifier)=1/3 to 1/0.8.

In other words, printing fixability requires both features, i.e., requires film-formability achieved by the polyamide resin serving as a binder resin and tackiness achieved by the tackifier, and if the polyamide resin is below the aforementioned range, the film-formability will be lowered, and, as a result, there is a risk that it will become difficult to perform excellent-fixability printing on, particularly, a polyolefin-based printing object or the like. Additionally, as a result of deterioration in film-formability, there is also a risk that the luster of a printing surface will deteriorate so that printing density is lowered or so that image quality is lowered.

If the tackifier is below the aforementioned range, tackiness will deteriorate, and, as a result, there is a risk that it will likewise become difficult to perform excellent-fixability printing on a polyolefin-based printing object or the like.

Additionally, if the tackifier is below the aforementioned range and if the polyamide resin is relatively above the range, there is also a risk that intermittent printability will deteriorate.

In other words, as described above, the dissolution of the polyamide resin depends on the alcohol having 1 to 3 carbon atoms of item (4) that is high in volatility, and therefore the alcohol earlier volatilizes at a decapping time, and the polyamide resin is liable to precipitate. Therefore, if the polyamide resin is abundant, there is a risk that the nozzle will become liable to be clogged, and intermittent printability will deteriorate in relation to excellence in film-formability of the polyamide resin.

If the tackifier is below the aforementioned range and if the polyamide resin is above the range, the film-formability of the inkjet ink will become too strong, and any problems do not occur at an ordinary printing speed, and yet high-speed printing makes it impossible to supply the inkjet ink without delay, and there is also a risk that blurring will occur particularly at the beginning of printing.

On the other hand, the compounding ratio between the polyamide resin and the tackifier is set to fall within the aforementioned range, and, as a result, it becomes possible to perform excellent-fixability printing on, particularly, a polyolefin-based printing object or the like while preventing intermittent printability from deteriorating or preventing blurring from occurring at the beginning of printing.

More preferably, in consideration of still further improvement of this effect, the compounding ratio (mass ratio) between the polyamide resin and the tackifier is 1/2.7 to 1/1 within the aforementioned range.

Additionally, the compounding proportion of the polyamide resin is, preferably, 1 mass % or more and is, preferably, 4 mass % or less in the total amount of the inkjet ink.

If the compounding proportion of the polyamide resin is less than this range, the film-formability will deteriorate as described above, and there is a risk that it will become difficult to perform excellent-fixability printing on, particularly, a polyolefin-based printing object or the like.

On the other hand, if the compounding proportion of the polyamide resin exceeds the range, there is a risk that the nozzle will become liable to be clogged because of a mechanism described above, and intermittent printability will deteriorate. There is also a risk that the storage stability of the inkjet ink will deteriorate.

Additionally, the compounding proportion of the tackifier is, preferably, 1 mass % or more and is, preferably, 4 mass % or less in the total amount of the inkjet ink.

If the compounding proportion of the tackifier is less than this range, tackiness will become insufficient as described above, and there is a risk that it will become difficult to perform excellent-fixability printing on, particularly, a polyolefin-based printing object or the like.

On the other hand, if the compounding proportion of the tackifier exceeds the range, film-formability will become lower than in the polyamide resin, and therefore there is a risk that the luster of a printing surface will deteriorate so that printing density is lowered or so that image quality is lowered. There is also a risk that the storage stability of the inkjet ink will deteriorate.

<(3) Solvent Dye>

Various solvent dyes having solubility with respect to the alcohol of item (4) are usable as the solvent dye.

One kind or two or more kinds are usable as the solvent dye at an appropriate ratio in accordance with the color tone and the color density of the inkjet ink.

Concrete examples of the solvent dye include various dyes etc., mentioned below.

(Yellow)

C.I. Solvent yellow 2, 14, 15, 16, 19, 21, 32, 56, 61, 65, 76, 79, 80, 81, 82, 83, 88, 89, 90, 91, 151; AIZEN (registered trademark) S. B. N. yellow 543, SPILON (registered trademark) Yellow C-GNH, C-2GH made by Hodogaya Chemical Co., Ltd.; Oplas (registered trademark) Yellow 140, VALIFAST (registered trademark) YELLOW 1101, 1109, 1151, 1171, 3108, 3120, 3150, 3170, 3180, 4120, 4121 made by ORIENT CHEMICAL INDUSTRIES Co., Ltd.; Alcohol Yellow Y-10, Oil Yellow CH made by CHUO GOUSEI KAGAKU CO., LTD.; DIARESIN (registered trademark) Yellow L3G made by Mitsubishi Chemical Corporation.

(Orange)

C.I. Solvent orange 1, 2, 5, 6, 11, 14, 20, 36, 41, 44, 45, 54, 56, 57, 58, 59, 62; VALIFAST ORANGE 1201, 2210, 3208, 3209, 3210 made by ORIENT CHEMICAL INDUSTRIES Co., Ltd.

(Red)

C.I. Solvent red 1, 3, 8, 23, 24, 25, 27, 35, 49, 78, 81, 82, 83, 84, 91, 96, 99, 100, 102, 109, 118, 119, 121, 122, 123, 124, 127, 128, 129, 130, 131, 132, 133, 134, 142, 160, 218, C.I. Disperse red 9; Orient Oil Pink OP, SPIRIT Red 102, VALIFAST Red 1308, 1320, 1355, 1364, 1388, 2303, 2320, 3304, 3306, 3311, 3312, 3320, PINK 2310N made by ORIENT CHEMICAL INDUSTRIES Co., Ltd.; AIZEN SPILON Fiery Red BH, Red C-GH, C-BH, Pink BH made by Hodogaya Chemical Co., Ltd.; AL Red 2308, Alcohol Pink P-30 made by CHUO GOUSEI KAGAKU CO., LTD.

(Brown)

C.I. Solvent brown 3, 23, 24, 25, 37, 42, 43, 44, 58

(Green)

C.I. Solvent green 3, 16, 21, 22; VALIFAST GREEN 1501 made by ORIENT CHEMICAL INDUSTRIES Co., Ltd.

(Blue)

C.I. Solvent blue 5, 11, 12, 24, 25, 38, 44, 46, 55, 64, 67, 70, 73, 75; Orient Oil Blue 603, VALIFAST Blue 1621, 1631, 2604, 2606, 2620, 2670 made by ORIENT CHEMICAL INDUSTRIES Co., Ltd.; AIZEN SPILON Blue C-RH, GNH, S.P.T. Blue 121 made by Hodogaya Chemical Co., Ltd.; Alcohol Blue B-10 made by CHUO GOUSEI KAGAKU CO., LTD.

(Violet)

C.I. Solvent violet 1, 2, 19, 21; VALIFAST VIOLET 1701, 1704 made by ORIENT CHEMICAL INDUSTRIES Co., Ltd.; AIZEN SPILON Violet C-RH, ECH made by Hodogaya Chemical Co., Ltd.

(Black)

C.I. Solvent Black 3, 5, 7, 22, 23, 25, 27, 28, 29, 30, 34, 35, 43, 47, 123; VALIFAST BLACK 1807, 1815, 3804, 3807, 3808, 3820, 3830, 3840, 3866, 3870 made by ORIENT CHEMICAL INDUSTRIES Co., Ltd.; Orasol (registered trademark) Black X55, X45, X51 made by BASF SE; RLS (Solvent Black 29), CN (Solvent Black 28) made by Intraplast Co., Ltd.

Particularly in consideration of improvements in light resistance of printing, it is preferable to use a metal complex dye among the solvent dyes.

<(4) Alcohol>

One kind or two or more kinds selected from among methanol, ethanol, 1-propanol, and 2-propanol can be mentioned as the alcohol having 1 to 3 carbon atoms.

The solubility of an solvent dye is the most important as a point to select the alcohol. This solubility is in order of methanol>ethanol>2-propanol>1-propanol, and, from the viewpoint of solubility, methanol and ethanol are desirable, and, particularly in consideration of reduction of a burden on the environment, ethanol is desirable.

Additionally, it is also possible to use 2-propanol and/or 1-propanol together while using ethanol as a principal component of the alcohol.

The compounding proportion of the alcohol is set to be a remaining amount of inkjet ink. In other words, it is recommended to prepare the inkjet ink such that respective components of items (1) to (3) mentioned above or respective components of next item (5) and of subsequent items that may be additionally compounded in the inkjet ink of the present invention are compounded together at a predetermined proportion, and such that furthermore an alcohol is added so that the total amount becomes 100 mass %.

<(5) Glycol Ether>

Glycol ether expressed by Formula (a):

$$C_n(OH)H_{2n}-O-C_mH_{2m+1} \quad (a)$$

[where n indicates numerals 2 to 4, and m indicates numerals 1 to 3] may be compounded in the inkjet ink of the present invention.

This glycol ether has solubility substantially equal in solubility to ethanol with respect to an solvent dye. In addition to this, the alcohol of item (4), such as ethanol, has the capability of surfacewisely wetting and spreading on the surface of the aforementioned polyolefin-based printing object or the like, whereas glycol ether has the capability of depthwisely infiltrating from the surface thereof to its inside. Moreover, the contact angle with respect to the surface of the polyolefin-based printing object or the like is large.

Therefore, the compounding of glycol ether makes it difficult for the inkjet ink to surfacewisely wet and spread, and the infiltration of the glycol ether into the printing object makes it possible to swiftly dry the inkjet ink (infiltration drying), and, as a result, advantageously, it is possible to improve printing clarity, and hence is possible to improve image quality.

Various glycol ethers that satisfy Formula (a) are usable as the glycol ether.

However, the glycol ether of Formula (a) is lower in volatility than the alcohol of item (4), and therefore, in consideration of the fact that the quick-drying properties of the inkjet ink are not deteriorated as much as possible, it is preferable to use a propylene glycol methyl ether having high volatility among the glycol ethers.

If ethanol is a principal component as the alcohol of item (4), the compounding proportion of the glycol ether is, preferably, 10 mass % or more and is, preferably, 25 mass % or less in the total amount of the inkjet ink.

If the compounding proportion of the glycol ether is less than this range, there is a risk that an effect to improve printing clarity and to improve image quality, which is brought about by this glycol ether, cannot be satisfactorily obtained.

On the other hand, if the compounding proportion of the glycol ether exceeds the range, the proportion of the alcohol relatively becomes small, and therefore solubility with respect to the alcohol is excellent, and yet there is a risk that the polyamide resin of item (1) etc., that do not have sufficient solubility with respect to glycol ether cannot be excellently dissolved in the inkjet ink.

Therefore, there is a risk that the storage stability of the inkjet ink will become defective so that precipitation is liable to occur, or the intermittent printability thereof will become defective so that the nozzle is liable to be clogged for a decapping time.

If the compounding proportion of the glycol ether exceeds the aforementioned range, solubility will become too strong, and therefore there is also a risk that, for example, the head of the inkjet printer will be impaired, and, as a result, the inkjet ink will be contaminated by components that have been eluted thereby. There is also a risk that the quick-drying properties of the inkjet ink will deteriorate as described above.

<(6) Butanol>

Butanol, instead of the glycol ether of item (5), may be compounded in the inkjet ink of the present invention.

If an inkjet ink in which a glycol ether is compounded is used, it is possible to perform excellent-clarity printing on the surface of a polyolefin-based printing object or the like by means of the aforementioned mechanism.

However, if the aforementioned inkjet ink is used in high-speed printing whose printing speed is, for example, 40 inch/second (set frequency: 12.0 kHz) that is twice the speed of ordinary printing performed at a printing speed of 20 inch/second (set frequency: 6.0 kHz) and if black-solid printing or similar printing is performed on the surface of, particularly, a polyolefin-based printing object, such as polypropylene laminated paper or the like, there is a tendency to easily cause a white-stripe defect. The reason therefor is that the aforementioned feature of a glycol ether appears too strongly. Additionally, the reason therefor is that the paper feed speed or the ink-droplet discharge speed becomes higher, and the place that an ink droplet strikes deviates easily, and therefore white stripes become liable to be conspicuous.

On the other hand, if butanol is used instead of the glycol ether, the butanol surfacewisely wets and spreads on the surface of a polyolefin-based printing object or the like more easily than the glycol ether, and therefore it is possible to restrain the occurrence of white stripes.

Any of 1-butanol, 2-butanol, isobutyl alcohol, and tert-butyl alcohol is usable as the butanol.

Particularly, 1-butanol that is higher in polarity among these four kinds is capable of easily wetting and spreading surfacewisely on the surface of a polyolefin-based printing object or the like, and is excellent in the function to prevent the occurrence of white stripes, and therefore 1-butanol is suitably used.

The compounding proportion of the butanol is, preferably, 0.5 mass % or more and is, preferably, 5 mass % or less in the total amount of the inkjet ink.

If the compounding proportion of the butanol is less than this range, there is a risk that the white-stripe preventing effect brought about by compounding the butanol cannot be satisfactorily obtained.

Additionally, the butanol is low in solubility with respect to an solvent dye, and therefore if the compounding proportion of the butanol exceeds the aforementioned range, it is impossible to excellently dissolve the solvent dye, and there is a risk that the storage stability or the intermittent printability of the inkjet ink will deteriorate. There is also a risk that the quick-drying properties of the inkjet ink will deteriorate.

If the butanol of item (6) is compounded instead of the glycol ether of item (5), two kinds, i.e., ethanol and propanol are used together as the alcohol of item (4).

Propanol is superior to butanol in the solubility of an solvent dye and in the quick-drying properties, and therefore, if the propanol is used together with butanol that is low in the solubility of an solvent dye and in the quick-drying properties but is excellent in the solubility of a tackifier, such as terpene phenol resin, and with ethanol that is low in solubility of a tackifier but is excellent in the solubility of an solvent dye, it is possible to attain an optimal balance between the solubility and the quick-drying properties.

Both 1-propanol and 2-propanol are usable as the propanol. 1-propanol is more desirable because this is excellent particularly in the solubility of a tackifier.

It is recommended to set the compounding proportion of propanol to be the remaining amount of the ethanol of item (4), the butanol of item (6), and the polyoxyethylene castor oil-based surfactant of item (7). In other words, it is recommended to set the compounding proportion of the propanol so that a total amount obtained by further adding the propanol to those three kinds becomes equal to the compounding proportion of the total of the alcohol of item (4) and the glycol ether of item (5) if this glycol ether is compounded.

<(7) Polyoxyethylene Castor Oil-Based Surfactant>

In an inkjet ink in which the butanol of item (6) is compounded instead of the glycol ether of item (5) and in which two kinds, i.e., ethanol and propanol are compounded together as the alcohol of item (4), it is preferable to additionally compound at least one kind of polyoxyethylene castor oil-based surfactant selected from the group consisting of polyoxyethylene castor oil and polyoxyethylene hydrogenated castor oil.

The compounding of the polyoxyethylene castor oil-based surfactant makes it possible to slightly restrain the inkjet ink from being dried so that the inkjet ink can more easily wet and spread surfacewisely and makes it possible to more excellently restrain the occurrence of white stripes when black-solid printing or similar printing is performed on the surface of a polyolefin-based printing object or the like particularly in high-speed printing.

Preferably, surfactants whose HLB (hydrophile-lipophile balance) is 2.5 to 8 are selected and used as the polyoxyethylene castor oil-based surfactant.

If a polyoxyethylene castor oil-based surfactant whose HLB is less than this range and that is high in lipophilicity is used, there is a risk that printing will be left with a sense of stickness. On the other hand, if a polyoxyethylene castor oil-based surfactant whose HLB exceeds the aforementioned range and that is high in hydrophilicity, there is a risk that the wettability of the inkjet ink will deteriorate with respect to the surface of a polyolefin-based printing object or the like, and white stripes will easily occur.

One kind or two or more kinds among, for example, BLAUNON BR-404 (HLB: 3.2), BR-406 (HLB: 4.4), BR-410 (HLB: 6.4), BR-4135 (HLB: 7.8), etc., made by AOKI OIL INDUSTRIAL Co., Ltd. can be mentioned as the polyoxyethylene castor oil whose HLB is within the aforementioned range.

Additionally, one kind or two or more kinds selected from among, for example, NIKKOL (registered trademark) HCO-5 (HLB: 6.0), HCO-10 (HLB: 6.5) made by NIKKO CHEMICALS Co., Ltd., BLAUNON CW-3 (HLB: 2.8), CW-10 (HLB: 6.4) made by AOKI OIL INDUSTRIAL Co., Ltd., etc., can be mentioned as the polyoxyethylene hydrogenated castor oil whose HLB is within the aforementioned range.

The compounding proportion of the polyoxyethylene castor oil-based surfactant is, preferably, 0.5 mass % or more and is, preferably, 2 mass % or less in the total amount of the inkjet ink.

If the compounding proportion of the polyoxyethylene castor oil-based surfactant is less than this range, there is a risk that the white-stripe preventing effect brought about by compounding the polyoxyethylene castor oil-based surfactant cannot be satisfactorily obtained. On the other hand, if the compounding proportion of the polyoxyethylene castor oil-based surfactant exceeds the range, there is a risk that the quick-drying properties of the inkjet ink will deteriorate, or printing will be left with a sense of stickness.

<(8) Acetone>

Acetone may be additionally compounded as the alcohol of item (4) in an inkjet ink in which ethanol and propanol are compounded together and in which two components of items (6) and (7) are compounded together.

In order to cope with demands for further energy saving in recent years, the ink jet printer has also been required to reduce power consumption still further.

Therefore, for example, in a thermal type inkjet printer in which an inkjet ink is heated so as to generate bubbles, and then an inkjet ink equivalent to a resulting volume increase is discharged from a nozzle as ink droplets, heating voltage tends to be made lower than in the present situation.

However, if an inkjet ink including each component of items (6) to (8) is applied to such a voltage lowered inkjet printer, the volume of every ink droplet discharged from the nozzle becomes smaller than in the present situation, and therefore, when it is used particularly in high-speed printing and when black-solid printing or similar printing is performed on the surface of a polyolefin-based printing object or the like, a white-stripe defect tends to easily occur.

On the other hand, if a small amount of acetone having a low boiling point is compounded in the inkjet ink, it is possible to discharge an ink droplet, which has a sufficient volume even in low voltage, from the nozzle, and it is possible to more excellently restrain the occurrence of white stripes.

The compounding proportion of acetone is, preferably, 0.5 mass % or more and is, preferably, 4 mass % or less in the total amount of the inkjet ink.

If the compounding proportion of acetone is less than this range, there is a risk that the white-stripe preventing effect brought about by compounding the acetone cannot be satisfactorily obtained.

On the other hand, if the compounding proportion of acetone exceeds the aforementioned range, there is a risk that the quick-drying properties of the inkjet ink will become too strong so that intermittent printability deteriorates or the inkjet ink will become dry before wetting and spreading on the surface of a printing object, and therefore white stripes will become liable to occur on the contrary. There is also a risk that the solubility of the inkjet ink will become too strong, and therefore the head of the inkjet printer will be impaired, and, as a result, the inkjet ink will be contaminated by components that have been eluted thereby.

It is effective to compound acetone in such a manner as to substitute a part of butanol that is low in quick-drying properties.

<(9) Other Components>

Various additives, such as surfactant, fatty acid amide, chelate compound, and high boiling point solvent, may be additionally compounded in the inkjet ink of the present invention.

(Surfactant)

A surfactant functions to secure an excellent discharge characteristic while adjusting the wettability with respect to the nozzle of the inkjet ink or functions to improve the image quality of printing while adjusting the wettability with respect to a printing object.

Various surfactants that are dissolvable in the alcohol of item (4) among various surfactants, such as silicone-based surfactant and fluorine-based surfactant, other than the polyoxyethylene castor oil-based surfactant of item (7) are usable as the surfactant.

Particularly, an acrylic silicone copolymer-based surfactant among the silicone-based surfactants is capable of restraining the alcohol of item (4) from surfacewisely wetting and spreading on the surface of a polyolefin-based printing object or the like as described above, and hence is capable of raising printing clarity and improving image quality, and hence is suitably usable as the surfactant.

One kind or two or more kinds selected from among, for example, KP541, KP543, KP545 made by Shin-Etsu Chemical Co., Ltd., BYK-3550 made by BYK Japan K.K., etc., can be mentioned as the acrylic silicone copolymer-based surfactant.

The compounding proportion of the surfactant is, preferably, 0.1 mass % or more and is, preferably, 1.5 mass % or less in the total amount of the inkjet ink.

Although an effect brought about by the surfactant by which the inkjet ink is restrained from wetting and spreading surfacewisely so as to improve clarity and an effect brought about by each component mentioned above by which the inkjet ink is urged to wet and spread surfacewisely so as to prevent the occurrence of white stripes seem to contradict each other, it becomes possible to perform satisfactory printing that does not make white stripes on the surface of a polyolefin-based printing object or the like and that is also excellent in clarity by balancing the functions with each other while using each component together particularly when the inkjet ink is used in high-speed printing.

(Fatty Acid Amide)

Fatty acid amide functions to improve the resistance to scratch, resistance to wear, and resistance to transfer of printing.

Various fatty acid amides that are dissolvable in at least one kind selected from among, for example, the alcohol of item (4), the glycol ether of item (5), the butanol of item (6), and the acetone of item (8) among saturated fatty acid amides, unsaturated fatty acid amides, modified fatty acid amides, etc., can be mentioned as the fatty acid amide, and, particularly, oleic amide is desirable.

The compounding proportion of the fatty acid amide is, preferably, 0.1 mass % or more and is, preferably, 0.5 mass % or less in the total amount of the inkjet ink.

(Chelate Compound)

A chelate compound functions to improve the storage stability of the inkjet ink or to prevent the clogging of the nozzle by catching metal elements deriving from a metal complex dye or catching polyvalent metal ions contained in the inkjet ink as impurities, such as aluminum ions, calcium ions, iron ions, magnesium ions, and manganese ions. Particularly in a thermal type inkjet printer, it is also possible to prevent the occurrence of so-called kogation.

Various chelate compounds that have the aforementioned functions and that are dissolvable in at least one kind selected from among the alcohol of item (4), the glycol ether of item (5), the butanol of item (6), and the acetone of item (8) can be mentioned as the chelate compound, and, particularly, a titanium chelate compound is desirable.

The titanium chelate compound has the aforementioned functions, and acts as a crosslinking agent that is effective for the tackifier of item (2). Crosslinking does not substantially appear in the inkjet ink in which ethanol etc., are present in a remarkably excessive state, and yet, for example, if these are released outwardly from the system because of drying after the completion of printing, a crosslinking reaction occurs, and the titanium chelate compound functions to improve printing resistance.

One kind or two or more kinds selected from among, for example, β-diketone chelate compounds, such as titanium acetylacetonate, titanium tetraacetylacetonate, and titanium ethyl acetoacetate, titanium phosphate compounds, glycol chelate compounds, such as titanium octylene glycolate, ketoester chelate compounds, such as titanium ethyl acetoacetate, hydroxycarboxylic chelate compounds, etc., can be mentioned as the titanium chelate compound. Particularly, the β-diketone chelate compound is desirable.

One kind or two or more kinds selected from among, for example, ORGATIX (registered trademark) TC-100 (titanium acetylacetonate), TC-401 (titanium tetraacetylacetonate) made by Matsumoto Fine Chemical Co., Ltd. can be mentioned as concrete examples of the β-diketone chelate compound.

The compounding proportion of the chelate compound is, preferably, 0.5 mass % or more and is, preferably, 3 mass % or less in the total amount of the inkjet ink.

(High Boiling Point Solvent)

A high boiling point solvent functions to restrain an inkjet ink from rapidly drying and to prevent a nozzle from being clogged for a decapping time.

Various solvents that do not dry naturally at normal temperature in the form of a simple substance are usable as the high boiling point solvent.

At least one kind selected from among, for example, benzyl alcohol, methyl dihydrojasmonate, etc., can be mentioned as the high boiling point solvent. Particularly when two kinds of high boiling point solvents consisting of benzyl alcohol and methyl dihydrojasmonate are used together, it is possible to improve printing clarity and improve image quality.

The compounding proportion of the high boiling point solvent is, preferably, 0.5 mass % or more and is, preferably, 3 mass % or less in the total amount of the inkjet ink.

(Water)

Water may be compounded in the inkjet ink of the present invention.

If so, in order to secure quick-drying properties, it is preferable to create an organic-solvent rich state in which the amount of water is smaller than the total amount of organic solvents combined together by being selected from among the alcohol of item (4), the glycol ether of item (5), the butanol of item (6), and the acetone of item (8).

However, preferably, the inkjet ink is made to non-aqueous ink without water in consideration of, for example, clear printing without cissing etc., or of the improvement of quick-drying properties when printing is performed on, particularly, a polyolefin-based printing object or the like.

(Others)

Various conventionally well-known additives may be further compounded in the inkjet ink of the present invention. For example, fungicides, biocidal agents, etc., can be mentioned as those additives. The compounding proportion of each additive is, preferably, 0.1 mass % or more and is, preferably, 1 mass % or less in the total amount of the inkjet ink.

The inkjet ink of the present invention is suitably usable in, for example, a thermal type or piezo type inkjet printer, i.e., a so-called on-demand type inkjet printer, and is also applicable to a so-called continuous type ink jet printer in which ink droplets are formed while circulating the ink to perform printing.

Particularly by ink jet printing that employs inkjet printers of various types mentioned above, the inkjet ink of the present invention can be suitably used to perform printing on surfaces of various non-absorptive printing object, such as various plastic films including polyolefin-based films, coated paper, and laminated paper.

And, characters, patterns, etc., that are excellent in fixability can be printed on the surface of that non-absorptive printing object.

EXAMPLES

Example 1

Each component mentioned below was compounded, and was then filtered by use of a membrane filter of 5 μm, and an inkjet ink was prepared.

TABLE 1

| Component | Parts by mass |
| --- | --- |
| Polyamide resin | 1.50 |
| Rosin ester | 2.50 |
| Solvent dye | 8.00 |
| Alcohol | 62.80 |

TABLE 1-continued

| Component | Parts by mass |
| --- | --- |
| Glycol ether | 20.00 |
| Surfactant | 1.00 |
| Fatty acid amide | 0.20 |
| Chelate compound | 2.00 |
| Benzyl alcohol | 1.50 |
| Methyl dihydrojasmonate | 0.50 |

Each component in the table is as follows.
Polyamide resin: Versamid 759 made by BASF Japan Ltd.
Rosin ester: Hydroxyl value is 30 mgKOH/g
Solvent dye: C.I. Solvent Black 29
Alcohol: Ethanol
Glycol ether: Propylene glycol methyl ether
Surfactant: Acrylic silicone copolymer-based surfactant
Fatty acid amide: Oleic amide
Chelate compound: Titanium acetylacetonate The compounding ratio (mass ratio) between polyamide resin and rosin ester was 1/1.7.

Example 2

An inkjet ink was prepared in the same way as in Example 1 except that the same amount of rosin ester whose hydroxyl value is 11.5 mgKOH/g was compounded as the rosin ester.

The compounding ratio (mass ratio) between polyamide resin and rosin ester was 1/1.7.

Example 3

An inkjet ink was prepared in the same way as in Example 1 except that the same amount of rosin ester whose hydroxyl value is 40 mgKOH/g was compounded as the rosin ester.

The compounding ratio (mass ratio) between polyamide resin and rosin ester was 1/1.7.

Example 4

An inkjet ink was prepared in the same way as in Example 1 except that the same amount of terpene phenol resin whose hydroxyl value is 30 mgKOH/g was compounded instead of the rosin ester.

The compounding ratio (mass ratio) between the polyamide resin and terpene phenol resin was 1/1.7.

Example 5

An inkjet ink was prepared in the same way as in Example 4 except that the same amount of terpene phenol resin whose hydroxyl value is 10 mgKOH/g was compounded as the terpene phenol resin.

The compounding ratio (mass ratio) between polyamide resin and terpene phenol resin was 1/1.7.

Example 6

An inkjet ink was prepared in the same way as in Example 4 except that the same amount of terpene phenol resin whose hydroxyl value is 40 mgKOH/g was compounded as the terpene phenol resin.

The compounding ratio (mass ratio) between polyamide resin and terpene phenol resin was 1/1.7.

Example 7

An inkjet ink was prepared in the same way as in Example 4 except that the compounding amount of polyamide resin was 0.90 parts by mass, the compounding amount of terpene phenol resin was 3.10 parts by mass, and the compounding ratio (mass ratio) between polyamide resin and terpene phenol resin was 1/3.4.

Example 8

An inkjet ink was prepared in the same way as in Example 4 except that the compounding amount of polyamide resin was 1.00 parts by mass, the compounding amount of terpene phenol resin was 3.00 parts by mass, and the compounding ratio (mass ratio) between polyamide resin and terpene phenol resin was 1/3.

Example 9

An inkjet ink was prepared in the same way as in Example 4 except that the compounding amount of polyamide resin was 2.22 parts by mass, the compounding amount of terpene phenol resin was 1.78 parts by mass, and the compounding ratio (mass ratio) between polyamide resin and terpene phenol resin was 1/0.8.

Example 10

An inkjet ink was prepared in the same way as in Example 4 except that the compounding amount of polyamide resin was 2.50 parts by mass, the compounding amount of terpene phenol resin was 1.50 parts by mass, and the compounding ratio (mass ratio) between polyamide resin and terpene phenol resin was 1/0.6.

Example 11

An inkjet ink was prepared in the same way as in Example except that the same amount of polyether-modified silicone-based surfactant was compounded instead of the acrylic-silicone copolymer-based surfactant.

The compounding ratio (mass ratio) between polyamide resin and terpene phenol resin was 1/1.7.

Example 12

An inkjet ink was prepared in the same way as in Example 4 except that the same amount of 2-propanol was compounded instead of the propylene glycol methyl ether.

The compounding ratio (mass ratio) between polyamide resin and terpene phenol resin was 1/1.7.

Comparative Example 1

An inkjet ink was prepared in the same way as in Example 4 except that the same amount of terpene resin whose hydroxyl value was 3 mgKOH/g was compounded instead of the terpene phenol resin.

The compounding ratio (mass ratio) between polyamide resin and terpene resin was 1/1.7.

Comparative Example 2

An inkjet ink was prepared in the same way as in Example 4 except that the same amount of terpene phenol resin whose hydroxyl value is 50 mgKOH/g was compounded as the terpene phenol resin.

The compounding ratio (mass ratio) between polyamide resin and terpene phenol resin was 1/1.7.

<Storage Stability Evaluation>

The inkjet inks prepared in Examples 1 to 12 and Comparative Examples 1 and 2 mentioned above were stored for one week at 60° C., and thereafter the respective states were observed, and each storage stability was evaluated by the following criteria.

Excellent: Precipitation was not found at all. Storage stability is excellent.

Bad: Precipitation was found. Storage stability is bad.

<Intermittent Printability Evaluation>

The inkjet inks prepared in Examples 1 to 12 and Comparative Examples 1 and 2 were used in a thermal type inkjet printer [Print Mail Wide Array made by VIDEOJET K.K., Heating voltage: 11V, Printing speed: 20 inch/second (Set frequency: 6.0 kHz)], and it was observed whether clear printing is possible without causing the clogging of a nozzle and the like immediately after the end of a decapping time during which an inkjet ink in the nozzle is exposed to the open air while changing the duration of the decapping time in a state in which ink droplets are not discharged, and intermittent printability was evaluated by the following criteria.

Excellent: Clear printing was possible even when the decapping time was ten minutes or more. Intermittent printability is excellent.

Ordinary: Clear printing was possible when the decapping time was one minute or more and was less than ten minutes. Intermittent printability is at an ordinary level.

Bad: Clear printing was impossible when the decapping time was not less than one minute. Intermittent printability is bad.

<Fixability Evaluation>

The inkjet inks prepared in Examples 1 to 12 and Comparative Examples 1 and 2 were used in the thermal type inkjet printer [Print Mail Wide Array made by VIDEOJET K.K., Heating voltage: 11V, Printing speed: 20 inch/second (Set frequency: 6.0 kHz)], and printing was performed on the surface of a polypropylene film, and the resultant polypropylene film was left to stand for one day, and thereafter a state in which the printing was rubbed with a cotton swab was observed, and fixability was evaluated by the following criteria.

Excellent: The printing was not able to be removed. Fixability is excellent.

Ordinary: The printing was able to be removed slightly. However, fixability is at an ordinary level.

Bad: The printing was able to be removed. Fixability is bad.

<Image Quality Test>

The inkjet inks prepared in Examples 1 to 12 and Comparative Examples 1 and 2 were used in the thermal type inkjet printer [Print Mail Wide Array made by VIDEOJET K.K., Heating voltage: 11V, Printing speed: 20 inch/second (Set frequency: 6.0 kHz)], and a bar code was printed on the surface of a vinyl-coated paper, and a line edge was enlarged and observed with a loupe, and the image quality of printing was evaluated by the following criteria.

Excellent: The printing was printed clearly without trouble. Image quality is excellent.

Ordinary: The printing has some blots. However, image quality is at an ordinary level.

Bad: The printing has large blots. Image quality is bad.

<Blurring Evaluation at High-Speed Printing>

The inkjet inks prepared in Examples 1 to 12 and Comparative Examples 1 and 2 were used in the thermal type inkjet printer [Print Mail Wide Array made by VIDEOJET K.K., Heating voltage: 11 V], and the printing speed was set at 40 inch/second (Set frequency: 12.0 kHz) that is twice the ordinary speed of 20 inch/second (Set frequency: 6.0 kHz), and black-solid printing of 1.2 cm×1.2 cm was performed on the surface of a vinyl-coated paper.

Thereafter, the presence or absence of blurring of printing was observed, and the presence or absence of blurring at high-speed printing was evaluated by the following criteria.

Excellent: Blurring was not found at all.
Ordinary: Slight blurring was found.
Bad: Distinct blurring was found.

Results obtained from the above tests are shown in Table 2 to Table 4. In these tables, reference signs Ro, Tp, and T in columns showing the kind of the tackifier designate Ro: rosin ester, Tp: terpene phenol resin, and T: terpene resin. Reference signs E, P, and G in columns showing the kind of the organic solvent designate E: ethanol, P: 2-propanol, and G: propylene glycol methyl ether. Additionally, reference signs ASi and PSi in columns showing the kind of the surfactant designate ASi: acrylic-silicone copolymer-based surfactant and PSi: polyether-modified silicone-based surfactant.

TABLE 2

| | | | Example 1 | Example 2 | Example 3 | Example 4 | Example 5 |
|---|---|---|---|---|---|---|---|
| Component | Tackifier | Kind | Ro | Ro | Ro | Tp | Tp |
| | | Hydroxyl value (mgKOH/g) | 30 | 11.5 | 40 | 30 | 10 |
| | | (Polyamide resin)/(Tackifier) | 1/1.7 | 1/1.7 | 1/1.7 | 1/1.7 | 1/1.7 |
| | | Kind of organic solvent | E + G | E + G | E + G | E + G | E + G |
| | | Kind of surfactant | ASi | ASi | ASi | ASi | ASi |
| Evaluation | | Storage stability | Excellent | Excellent | Excellent | Excellent | Excellent |
| | | Intermittent printability | Excellent | Excellent | Excellent | Excellent | Excellent |
| | | Fixability | Excellent | Excellent | Excellent | Excellent | Excellent |
| | | Image quality | Excellent | Excellent | Excellent | Excellent | Excellent |
| | | Blurring at high-speed printing | Excellent | Excellent | Excellent | Excellent | Excellent |

TABLE 3

| | | | Example 6 | Example 7 | Example 8 | Example 9 | Example 10 |
|---|---|---|---|---|---|---|---|
| Component | Tackifier | Kind | Tp | Tp | Tp | Tp | Tp |
| | | Hydroxyl value (mgKOH/g) | 40 | 30 | 30 | 30 | 30 |
| | | (Polyamide resin)/(Tackifier) | 1/1.7 | 1/3.4 | 1/3 | 1/0.8 | 1/0.6 |
| | | Kind of organic solvent | E + G | E + G | E + G | E + G | E + G |
| | | Kind of surfactant | ASi | ASi | ASi | ASi | ASi |
| Evaluation | | Storage stability | Excellent | Excellent | Excellent | Excellent | Excellent |
| | | Intermittent printability | Excellent | Excellent | Excellent | Excellent | Ordinary |
| | | Fixability | Excellent | Ordinary | Excellent | Excellent | ordinary |
| | | Image quality | Excellent | Ordinary | Excellent | Excellent | Excellent |
| | | Blurring at high-speed printing | Excellent | Excellent | Excellent | Excellent | Ordinary |

TABLE 4

| | | | Example 11 | Example 12 | Comparative example 1 | Comparative example 2 |
|---|---|---|---|---|---|---|
| Component | Tackifier | Kind | Tp | Tp | T | Tp |
| | | Hydroxyl value (mgKOH/g) | 30 | 30 | 3 | 50 |
| | | (Polyamide resin)/(Tackifier) | 1/1.7 | 1/1.7 | 1/1.7 | 1/1.7 |
| | | Kind of organic solvent | E + G | E + P | E + G | E + G |
| | | Kind of surfactant | PSi | ASi | ASi | ASi |
| Evaluation | | Storage stability | Excellent | Excellent | Bad | Excellent |
| | | Intermittent printability | Excellent | Excellent | Bad | Bad |
| | | Fixability | Excellent | Excellent | Excellent | Bad |
| | | Image quality | Ordinary | Ordinary | Excellent | Excellent |
| | | Blurring at high-speed printing | Excellent | Excellent | Bad | Excellent |

From the results of Examples 1 to 12 and Comparative Examples 1 and 2 of Table 2 to Table 4, it has been understood that an inkjet ink that is excellent in printing fixability with respect to, particularly, a polyolefin-based printing object or the like and that is also excellent in storage stability and in intermittent printability can be obtained by compounding the terpene phenol resin and/or the rosin ester that serves as a tackifier and whose hydroxyl value is 10 mgKOH/g or more and is 45 mgKOH/g or less with the polyamide resin, the alcohol having 1 to 3 carbon atoms, and the solvent dye.

From the results of Example 4 and Examples 7 to 10, it has been understood that, in order to still further improve the effect, it is preferable to set the compounding ratio (mass ratio) between polyamide resin and tackifier at 1/3 to 1/0.8.

Additionally, from the results of Example 4 and Examples 11 and 12, it has been understood that, in order to improve printing clarity and hence improve image quality, it is preferable to use an acrylic-silicone copolymer-based surfactant as the surfactant, and it is preferable to use an alcohol having 1 to 3 carbon atoms and the glycol ether of Formula (a) together as the organic solvent.

Example 13

An inkjet ink was prepared in the same way as in Example 4 except that 1-butanol of 4.00 parts by mass, polyoxyethylene hydrogenated castor oil [NIKKOL (registered trademark) HCO-5 (HLB: 6.0), made by NIKKO CHEMICALS Co., Ltd.] of 1.00 parts by mass, and 1-propanol of 16.00 parts by mass were compounded together instead of the glycol ether, and except that the compounding amount of ethanol was set at 61.80 parts by mass.

The compounding ratio (mass ratio) between polyamide resin and terpene phenol resin was 1/1.7.

Example 14

An inkjet ink was prepared in the same way as in Example 4 except that 1-butanol of 1.00 parts by mass, polyoxyethylene hydrogenated castor oil [NIKKOL (registered trademark) HCO-5 (HLB: 6.0), made by NIKKO CHEMICALS Co., Ltd.] of 1.00 parts by mass, 1-propanol of 16.00 parts by mass, and acetone of 2.00 parts by mass were compounded together instead of the glycol ether.

With respect to the inkjet inks of both examples mentioned above, each test of storage stability, intermittent printability, and fixability mentioned above was conducted, and each test mentioned below was conducted, and their characteristics were evaluated.

<White Stripes (at Ordinary Printing)>

The inkjet inks prepared in Examples 4, 13, and 14 were used in the thermal type inkjet printer [Print Mail Wide Array made by VIDEOJET K.K., Heating voltage: 11 V, Printing speed: 20 inch/second (Set frequency: 6.0 kHz)], and black-solid printing of 1.2 cm×1.2 cm was performed on the surface of a polypropylene laminated paper.

Thereafter, the presence or absence of white stripes was observed, and the presence or absence of white stripes at ordinary printing was evaluated by the following criteria.

Excellent: White stripes were not found at all.
Ordinary: Slight white stripes were found.
Bad: Distinct white stripes were found.

<White Stripes (at High-Speed Printing)>

The inkjet inks prepared in Examples 4, 13, and 14 were used in the thermal type inkjet printer [Print Mail Wide Array made by VIDEOJET K.K., Heating voltage: 11V], and the printing speed was set at 40 inch/second (Set frequency: 12.0 kHz) that is twice the ordinary speed of 20 inch/second (Set frequency: 6.0 kHz), and black-solid printing of 1.2 cm×1.2 cm was performed on the surface of a polypropylene laminated paper.

Thereafter, the presence or absence of white stripes was observed, and the presence or absence of white stripes at high-speed printing was evaluated by the following criteria.

Excellent: White stripes were not found at all.
Ordinary: Slight white stripes were found.
Bad: Distinct white stripes were found.

<White Stripes (at Low Voltage)>

The inkjet inks prepared in Examples 4, 13, and 14 were used in the thermal type inkjet printer [Print Mail Wide Array made by VIDEOJET K.K., printing speed: 40 inch/second (set frequency: 12.0 kHz)], and the heating voltage was set at 8.7 V, and black-solid printing of 1.2 cm×1.2 cm was performed on the surface of a polypropylene laminated paper.

Thereafter, the presence or absence of white stripes was observed, and the presence or absence of white stripes at low voltage was evaluated by the following criteria.

Excellent: White stripes were not found at all.
Ordinary: Slight white stripes were found.
Bad: Distinct white stripes were found.

Results obtained from the above tests are shown in Table 5.

TABLE 5

| | | | Example 4 | Example 13 | Example 14 |
|---|---|---|---|---|---|
| Component | Tackifier | Kind | Tp | Tp | Tp |
| | | Hydroxyl value (mgKOH/g) | 30 | 30 | 30 |
| | | (Polyamide resin)/ (Tackifier) | 1/1.7 | 1/1.7 | 1/1.7 |
| | | Ethanol | 62.80 | 61.80 | 62.80 |
| | | Glycol ether | 20.00 | — | — |
| | | 1-butanol | — | 4.00 | 1.00 |
| | | Polyoxyethylene hydrogenated castor oil | — | 1.00 | 1.00 |
| | | 1-propanol | — | 16.00 | 16.00 |
| | | Acetone | — | — | 2.00 |

TABLE 5-continued

|  |  |  | Example 4 | Example 13 | Example 14 |
|---|---|---|---|---|---|
| Evaluation |  | Storage stability | Excellent | Excellent | Excellent |
|  |  | Intermittent printability | Excellent | Excellent | Excellent |
|  |  | Fixability | Excellent | Excellent | Excellent |
|  | White stripes | At ordinary printing | Excellent | Excellent | Excellent |
|  |  | At high-speed printing | Ordinary | Excellent | Excellent |
|  |  | At low voltage | Ordinary | Ordinary | Excellent |

From the results of Examples 4 and 13 of Table 5, it has been understood that, when black-solid printing or similar printing is performed on the surface of, particularly, a polyolefin-based printing object, such as polypropylene-laminated paper or the like while using the inkjet ink in high-speed printing, it is possible to excellently restrain the occurrence of white stripes by compounding 1-butanol, polyoxyethylene castor oil-based surfactant, and 1-propanol together instead of the glycol ether.

Additionally, from the results of Examples 13 and 14, it has been understood that, even when the heating voltage is reduced, it is possible to excellently restrain the occurrence of white stripes by compounding 1-butanol, polyoxyethylene castor oil-based surfactant, 1-propanol, and acetone mentioned above.

The invention claimed is:

1. An inkjet ink, comprising:
a polyamide resin;
at least one tackifier that is selected from the group consisting of a terpene phenol resin and a rosin ester, and that has a hydroxyl value that ranges from 10 to 45 mgKOH/g;
a solvent dye; and
an alcohol having 1 to 3 carbon atoms.

2. The inkjet ink according to claim 1, further comprising a glycol ether expressed by Formula (a) below:

$$C_n(OH)H_{2n}-O-C_mH_{2m+1} \quad (a),$$

where n indicates numerals 2 to 4, and m indicates numerals 1 to 3.

3. The inkjet ink according to claim 1, wherein the alcohol is at least one alcohol selected from the group consisting of ethanol and propanol, and the inkjet ink further comprises:
butanol; and
at least one surfactant selected from the group consisting of polyoxyethylene castor oil and polyoxyethylene hydrogenated castor oil.

4. The inkjet ink according to claim 3, further comprising acetone.

5. The inkjet ink according to claim 1, wherein the polyamide resin and the tackifier are present in a compounding ratio (mass ratio) of polyamide resin to tackifier ranging from 1/3 to 1/0.8.

6. The inkjet ink according to claim 1, further comprising a surfactant that is an acrylic-silicone copolymer surfactant.

7. The inkjet ink according to claim 4, wherein the polyamide resin and the tackifier are present in a compounding ratio (mass ratio) of polyamide resin to tackifier ranging from 1/3 to 1/0.8.

8. The inkjet ink according to claim 3, wherein the polyamide resin and the tackifier are present in a compounding ratio (mass ratio) of polyamide resin to tackifier ranging from 1/3 to 1/0.8.

9. The inkjet ink according to claim 2, wherein the polyamide resin and the tackifier are present in a compounding ratio (mass ratio) of polyamide resin to tackifier ranging from 1/3 to 1/0.8.

10. The inkjet ink according to claim 9, further comprising a surfactant that is an acrylic-silicone copolymer surfactant.

11. The inkjet ink according to claim 8, further comprising a surfactant that is an acrylic-silicone copolymer surfactant.

12. The inkjet ink according to claim 7, further comprising a surfactant that is an acrylic-silicone copolymer surfactant.

13. The inkjet ink according to claim 5, further comprising a surfactant that is an acrylic-silicone copolymer surfactant.

14. The inkjet ink according to claim 4, further comprising a surfactant that is an acrylic-silicone copolymer surfactant.

15. The inkjet ink according to claim 8, further comprising a surfactant that is an acrylic-silicone copolymer surfactant.

16. The inkjet ink according to claim 2, further comprising a surfactant that is an acrylic-silicone copolymer surfactant.

* * * * *

UNITED STATES PATENT AND TRADEMARK OFFICE
CERTIFICATE OF CORRECTION

PATENT NO. : 10,253,199 B2
APPLICATION NO. : 15/303599
DATED : April 9, 2019
INVENTOR(S) : Kozo Isobe Page 1 of 1

It is certified that error appears in the above-identified patent and that said Letters Patent is hereby corrected as shown below:

In the Claims

Claim 15, Column 22, Line 46, change "claim 8" to -- claim 3 --.

Signed and Sealed this
Sixteenth Day of July, 2019

Andrei Iancu
*Director of the United States Patent and Trademark Office*